United States Patent [19]
Gerstenmaier et al.

[11] Patent Number: 4,475,159
[45] Date of Patent: Oct. 2, 1984

[54] METHOD OF STORING VEHICLE OPERATING CONDITION PARAMETERS

[75] Inventors: Jürgen Gerstenmaier, Neckar-Gmünd; Heinz Leiber, Oberriexingen; Werner Stumpe, Kornwestheim, all of Fed. Rep. of Germany

[73] Assignee: Robert Bosch GmbH, Stuttgart, Fed. Rep. of Germany

[21] Appl. No.: 459,877
[22] PCT Filed: Jan. 9, 1982
[86] PCT No.: PCT/DE82/00007
    § 371 Date: Dec. 27, 1982
    § 102(e) Date: Dec. 27, 1982
[87] PCT Pub. No.: WO82/04020
    PCT Pub. Date: Nov. 25, 1982

[51] Int. Cl.³ .............................................. B60T 8/10
[52] U.S. Cl. ...................................... 364/426; 303/96; 303/97; 246/182 B; 246/182 C
[58] Field of Search ............... 364/426; 303/96, 97, 303/110; 246/182 B, 182 C, 182 R

[56] References Cited
U.S. PATENT DOCUMENTS
4,114,957 9/1978 Eichhorst ............................. 303/96
4,181,943 1/1980 Mercer et al. ....................... 364/426

FOREIGN PATENT DOCUMENTS
1902944 of 1978 Fed. Rep. of Germany.
2232805 3/1975 France.

OTHER PUBLICATIONS
"DKF", Issue 87, p. 14 and FIG. 8.
"Verkehrsunfall" (Traffic Accident) May 79, pp. 101-106.
Bosch Technische Berichte, Antiblockiersystem (ABS), vol. 7, Issue 2.

Primary Examiner—J. V. Truhe
Assistant Examiner—Saul M. Bergmann
Attorney, Agent, or Firm—Frishauf, Holtz, Goodman & Woodward

[57] ABSTRACT

An anti-skid brake system for vehicles is proposed in which various transducers for detecting operating condition parameters of the vehicle are provided, which cooperate with an evaluation circuit in such a manner that control signals are formed on the basis of the transducer signals for influencing the brake pressure at predetermined operating conditions. Circuitry are additionally provided which store the operating condition parameters, such as vehicle speed and deceleration, braking path and the like, during the braking event under the predetermined operating conditions; and to control marking of the road surface during these braking events.

21 Claims, 6 Drawing Figures

METHOD OF STORING VEHICLE OPERATING CONDITION PARAMETERS

The invention relates to vehicle anti-skid systems, and methods of vehicle control, and more particularly to vehicle operating data suitable in such systems and methods.

BACKGROUND

Numerous anti-ski brake systems for vehicles are already known, in which vehicle operating condition parameters are detected by transducers and processed in an evaluation circuit into control signals for influencing the braking pressure whenever predetermined operating conditions arise, particularly those having to do with the slip that exists between the wheel and the road surface.

Anti-skid brake systems of this kind do provide vehicles thus equipped with superior braking performance as compared with vehicles having conventional brakes; on the other hand, however, it is difficult to reconstruct the course of events leading up to an accident should vehicles equipped with anti-skid brake systems be involved in the accident, because such vehicles leave practically no skid marks. The reason for this is that the usual anti-skid brake systems establish an amount of slip between the wheel and the road surface which does not quite result in a relative speed between wheel and road surface such as to cause the rolling tire to leave a skid mark.

It is an object to provide a method in which data arising due to operation of an anti-skid system, particularly under emergency conditions, can be stored or reconstructed so that, in case of accident, a reconstruction of the operating conditions, speeds, etc. of the vehicle having the automatic anti-skid braking system can be reconstructed; and, preferably, to so arrange the storage system that another vehicle could be commanded to operate in similar manner, for example under testing conditions, so that similar accidents can be avoided at a future time.

Briefly, the anti-skid or anti-brake lock system provides an output signal when it is effective, that is, when it provides control signals to be brakes of the vehicle. When such control signals controlling the brakes of the vehicle are generated, the signals are stored, for example in an electronic memory which may be part of a removable storage element so that the stored data can be analyzed at a later time, either, in case of accident, by police or courts or, for purposes of improvement, under testing conditions. In accordance with a feature of the invention, the storage of braking data is carried out by releasing a visible marker, such as paint or the like, on the pavement when the control signals applied to the brakes by the anti-skid system reach a certain level, or were initiated at predetermined speeds, the marking on the pavement then being similar to skid marks which, due to the operation of the anti-skid system, would not be visible or would not occur on the pavement.

In a preferred embodiment of the invention, a storage of the operating condition parameters is performed only when an evaluation circuit of the anti-skid brake system responds and, at the same time, a predetermined limiting value for deceleration is exceeded. As a result, a particular advantage is that unnecessary markings on the road surface are avoided, since storing of operating condition parameters is not required every time braking occurs with an anti-skid brake system in effect. In a further embodiment of the invention, storage is put into effect only if either the brake light switch or a brake pressure transducer responds. Thus further assurance is provided that on the one hand, storage of the operating condition parameters or marking of the road surface is performed only when braking has been initiated, while on the other hand it is assured that these processes will take place even if either the brake light switch or the brake pressure transducer is defective.

Furthermore, in accordance with a further embodiment of the invention, marking of the road surface is performed under critical operating conditions in such a manner that markings whose length is constant in terms of time are applied to the road surface; thus the length of the markings makes it possible to conclude what the speed of the vehicle was at the time they were made.

Particularly good results are furthermore attained if the storage means for operating condition parameters is accommodated in a sealed plug-connectable module, because on the one hand unauthorized access to the stored operating condition parameters is thereby prevented, while on the other the storage means is easily removed from the vehicle for the purpose of reconstructing operating conditions; by putting this storage means into other vehicles of the same type, it is possible to obtain an exact reconstruction of the braking event.

One method according to the invention has the further advantage that skid marks are generated briefly in a specifically defined manner, making it possible to reconstruct both the course and the speed of the vehicle.

An advantageous further embodiment of the method according to the invention is distinguished by the prolongation, during a test phase, of the braking pressure maintenance phase conventionally established in anti-skid braking systems; the result is increased brake slippage, and in turn the generation of sufficient frictional energy on the engagement surface of the tire that a skid mark is made.

According to a further preferred form of embodiment of the invention, a test phase of constant duration is specified, so that a conclusion as to the speed at the onset of the test phase can be drawn on the basis of the length of the skid mark in the test phase. If the onset of the test phase coincides with the first braking cycle, then an indication as to the speed at the onset of braking is obtained.

According to a further embodiment of the invention, the test phase is initiated only after the speed drops below a predetermined test vehicle speed; the duration of the test phase is made dependent on the speed at the onset of braking. In this manner, the length of the skid mark can be converted by calculation into the speed at the onset of braking.

In a further embodiment of the invention, test phases and phases of a braking event with a normal slip threshold are arranged in sequence, as a result of which not only the speed at the onset of braking but also the vehicle deceleration can be ascertained from the length of the skid marks or the distance between them.

Increased safety is furthermore attained according to a further embodiment of the invention in that the switching threshold for test slip is set to be at least approximately inversely proportional to the vehicle speed.

Finally, a further embodiment of the invention provides that in order to increase safety, the test phases become effective only with respect to the front wheels, or to one of the front wheels, and that the test phase is suppressed in predetermined critical operating conditions, which are ascertained on the basis of transverse acceleration, steering wheel deflection angle or the wheel deceleration gradient.

DRAWING

Exemplary embodiments of the invention are shown in the drawing and described in greater detail below. Shown are:

FIG. 1, a block circuit diagram of an anti-skid brake system according to the invention;

FIG. 2, a diagram explaining a test phase according to the invention;

FIG. 3a–3c, various diagrams explaining the temporal occurrence of test phases according to various forms of embodiment of the method according to the invention; and FIG. 4, a block circuit diagram of a circuit layout such as may be used for performing the method according to the invention.

DESCRIPTION OF THE EXEMPLARY EMBODIMENT

Figure 1:
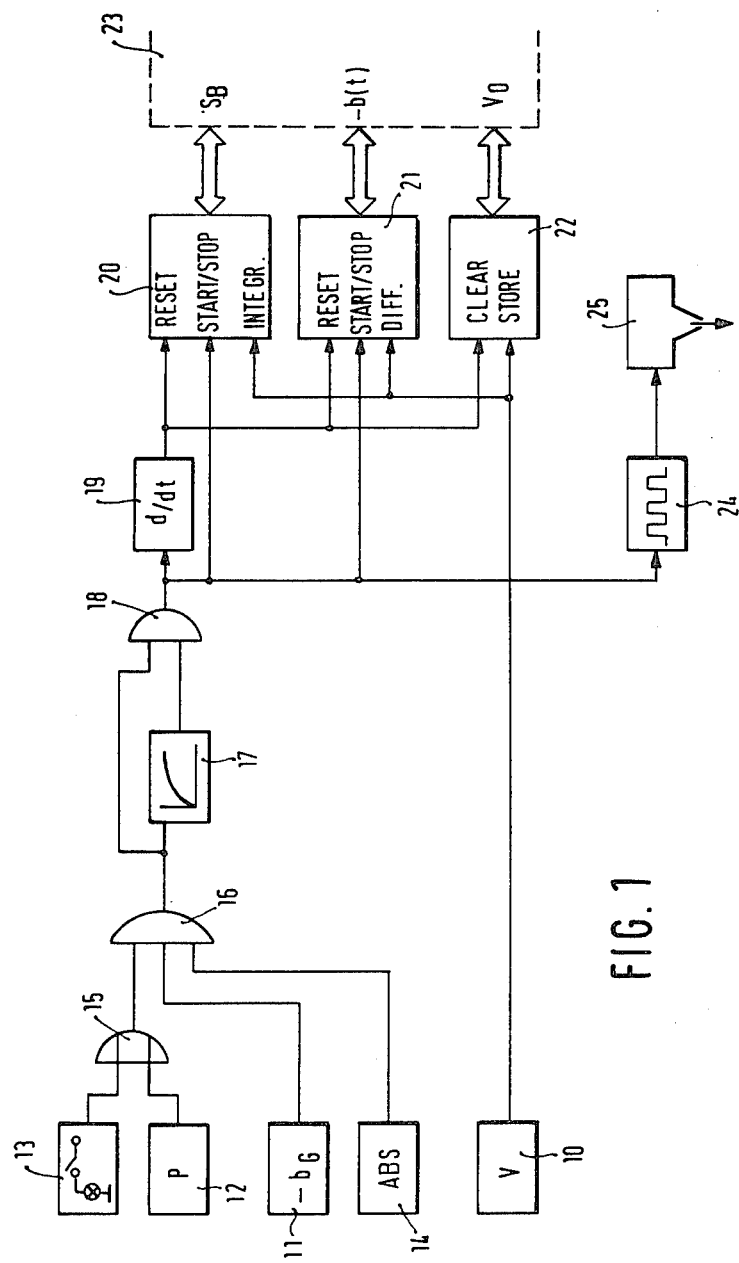

FIG. 1 shows a vehicle speed transducer 10, a threshold deceleration transducer 11, a brake pressure transducer 12, a brake light switch 13 and an anti-skid brake system evaluation device 14. The signals furnished by the elements 10–14 are utilized as input variables for the system, as shown in the drawing. The output signals of the brake pressure transducer 12 and the brake light switch 13 are applied to an OR gate 15, the output of which is connected with one input of an AND gate 16. The two other inputs of the AND gate 16 are connected with the threshold deceleration transducer 11 and the anti-skid brake system evaluation device 14, respectively. The output of the AND gate 16 is connected, first, directly to one input of a further AND gate 18 and, second, to the further input of the AND gate 18 via a delay element 17. The AND gate 18 is connected to the input of a differentiation element 19, which is connected on its output side with an integration circuit 20, a differentiation circuit 21 and a storage circuit 22. Circuits 20–22 are connected via data lines to an operating condition parameter store 23. The output of the AND gate 18 is furthermore applied to inputs of the integration circuit 20, the differentiaton circuit 21 and a pulse generator 24, which serves to trigger a road surface marking means 25. Finally, the vehicle speed transducer 10 is operatively connected with inputs of the circuits 20–22.

The vehicle speed transducer 10 generates a signal corresponding to the ground speed of the vehicle. This can be derived from the wheel speed of the wheel that is revolving the fastest; but it is naturally self-evident that a vehicle speed signal can be generated in other ways which are known in this context as well, for instance from the reference value existing in any case in the anti-skid brake system evaluation device 14, by integration of the vehicle deceleration with a measurement of the speed at the onset of braking, and the like.

The anti-skid brake system evaluation device 14 has is of a design known in many variations from the prior art. The output signal used in the circuit shown in the drawing provides information solely as to whether the anti-skid brake system is responding at a specific time, or not; that is, whether overbraking of the vehicle has taken place.

The threshold deceleration transducer 11 triggers a signal at its input whenever the vehicle deceleration has exceeded a predetermined threshold value $-b_G$. This signal then prevails at the output of the transducer until such time as the braking event has ceased. It is understood that this input variable as well can be generated in other ways, for instance via a threshold value circuit, which is supplied with the differentiated output signal of the vehicle speed transducer 10.

For the sake of comprehensibility, the circuit according to the drawing is designed for only one-dimensional operating condition parameters. In this simple realization, these parameters will be the vehicle speed and the vehicle deceleration in the longitudinal direction. As will readily be understood, it is also possible to store the operating condition parameters in the transverse direction in a corresponding manner; that is, the transverse speed or the transverse deceleration can be detected and stored.

The output signals of the brake light switch 13 and the brake pressure transducer 12 are linked with one another via the OR gate 15, thus assuring that an output signal will be generaed even if one of the two elements fails. The output signal of the OR gate 15 is linked together with the signals of the threshold deceleration transducer 11 and the anti-skid brake system evaluation device 14 in the AND gate 16. The intent is to assure in this manner that a storage of the operating condition parameters, or a marking of the road surface, is performed only in the presence of a threshold situation in terms of the operating condition. Naturally the logical linkage of the individual parameters may also be designed in some other way; the apparatus shown in the drawing must therefore be considered merely as an example. The further transmission of the output signal of the AND gate 16 via the delay element 17 and the AND gate 18 has the purpose of suppressing brief interference or noise pulses, should any occur at all at the output of the AND gate 16. That is, the two inputs of the AND gate 18 are triggered only if the output signal of the AND gate 16 is longer than the duration predetermined in the delay element 17. The output signal of the AND gate 18 as a wnole now represents a standard for the onset and the end of the braking event of interest in this context. From the leading edge of this output signal, a pulse is first formed in the differentiation element 19 which resets or erases the circuits 20–22. The output signal of the AND gate 18 now determines, first, the onset and the end of the integration or of the differentiation of the vehicle speed signal from the transducer 10 in the circuit 20 or 21, respectively; secondly, the instantaneous value of the vehicle speed is stored in memory in the storage circuit 22 at the onset of the braking event. The operating condition parameters stored or generated in the circuits 20–22 are now transferred via data lines to the operating condition parameter store 23. The integral of the vehicle speed formed in circuit 20 thereupon provides the braking path $s_B$. The first temporal derivative of the vehicle speed formed in the circuit 21 provides the vehicle deceleration in accordance with the time $-b_{(t)}$. The vehicle speed at the onset of the braking event, that is, the braking-onset speed $v_0$, was stored in memory in the circuit 22 and is now transferred into the operating condition parameter store 23.

These three operating condition parameters are thus available for use in the store 23 at the end of each braking event during one of the predetermined operating conditions. In a preferred form of embodiment of the invention, this operating condition parameter store 23 is embodied as a plug-connectable module, which is efficaciously secured with a seal to prevent it from being removed without authorization. In order to reconstruct the braking event, the seal is removed and the operating condition parameter store 23 taken out. The operating condition parameters stored in the store 23 can now be read out. However, it is also possible in accordance with the invention to feed these operating condition parameters, as control parameters, to the same vehicle or another vehicle of the same type, so that the braking event can be replicated under conditions as close to the actual event as possible.

The processing and storage of operating condition parameters described above is naturally not restricted to the operating condition parameters indicated. It is of course also possible, in a corresponding manner, to store further operating condition variables, such as brake pressure, steering wheel angle, vehicle speed in accordance with time in both the transverse and longitudinal directions, and the like.

Finally, in a further embodiment of the invention, the pulse generator 24 which actuates the road surface marking means 25 is triggered by the output of the AND gate 18. The road surface marking means 25 efficaciously sprays a coloring material in pulsed fashion; the pulse length has a constant time in a preferred embodiment of the invention. It is then possible by measuring the markings first to reconstruct the path taken by the vehicle and second to ascertain, from the length of the markings, the speed of the vehicle at the time they were made.

The two provisions described, that is, the storage of operating condition parameters and the marking of the road surface, can be used either alternatively or together. As described below, the road surface can also be marked in a clearly defined manner with a skid mark.

Figure 2:
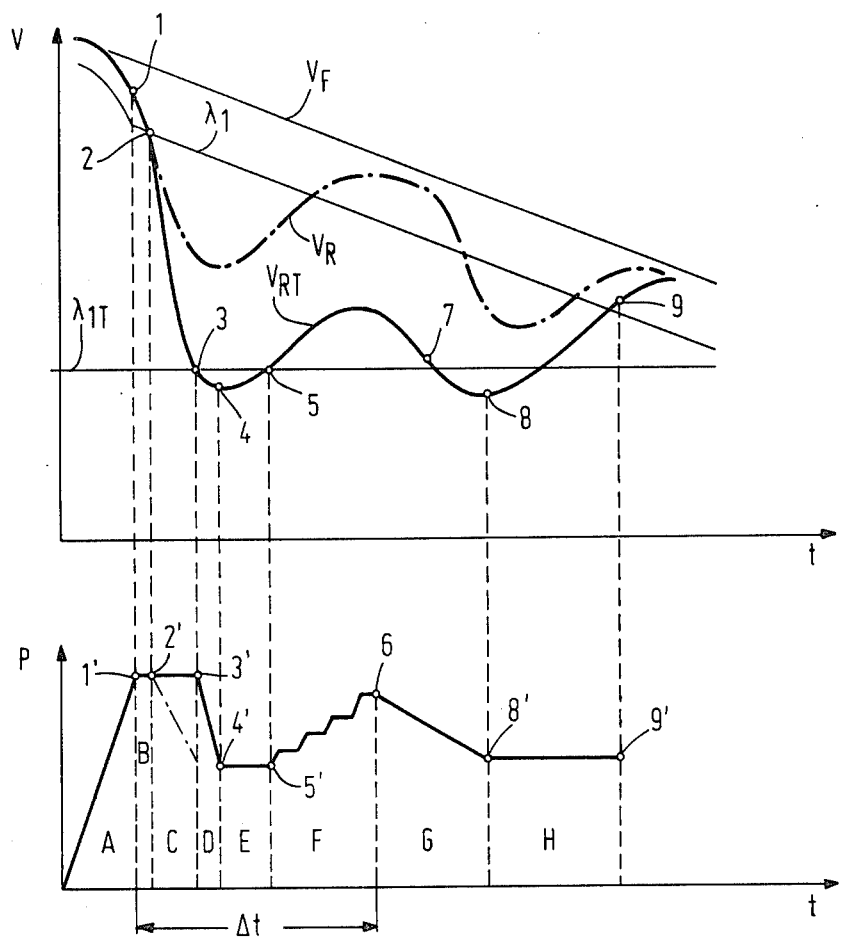

Two diagrams are shown in FIG. 2: first, a diagram plotting speed over time, or v (t), and second, a diagram plotting brake pressure over time, or p (t). The first diagram shows the vehicle speed $v_F$, the wheel speed $v_R$ during normal operation with an anti-skid brake system and the wheel speed $v_{RT}$ in a test phase, as will be explained in detail below. The lower diagram, by contrast, shows the brake pressure p during a test phase, while the brake pressure that would prevail conventionally is indicated merely by dot-dash lines.

From the sources cited at the outset above among others, it is known that the brake pressure can be adjusted over time in accordance with the exceeding of, or falling below, predetermined thresholds for wheel speed deceleration or acceleration. Upon the initiation of a braking event, the brake pressure will first increase in the zone marked A, and the wheel speed will drop sharply in comparison with the vehicle speed. At point 1, a predetermined deceleration threshold $-b$ is then exceeded, causing the maintenance of a constant value of brake pressure from point 1' on in the brake pressure diagram. In conventional anti-skid brake systems, this pressure maintenance phase B lasts until such time as the wheel speed has exceeded a predetermined slip threshold $\lambda_1$, which is indicated in the upper part of the speed diagram; this is the case at point 2 in the diagram of FIG. 2. Beyond the associated point 2' in the pressure diagram, the brake pressure in a conventional anti-skid brake system would again drop, as indicated by dot-dash lines in the pressure diagram. The result would then be a course of the wheel speed $v_R$ such as is shown, again in dot-dash lines, in the upper part of FIG. 2.

However, in accordance with the method of the invention, regulation is based not on the conventional slip switching threshold $\lambda_1$, but rather on a test slip switching threshold $\lambda_{1T}$ during a test phase; this latter threshold is substantially higher than the slip switching threshold $\lambda_1$, for example by as much as 50%. Accordingly, the brake pressure is kept constant until the value falls below this test slip switching threshold $\lambda_{1T}$ at point 3, resulting in a pressure maintenance phase C until point 3'. Only beyond this point 3' is the pressure reduced once again, in a zone D, until the wheel deceleration has decreased to such an extent that the threshold value $-b$ has again been attained, at point 4. Beyond the associated point 4' in the pressure diagram, the pressure is now kept constant once again in zone E, until the wheel speed $v_{RT}$ has once again exceeded the test slip switching threshold $\lambda_{1T}$ at point 5. Beyond the associated point 5', the pressure is once again built up in zone F, preferably incrementally, until the end of the test phase is attained at point 6. The duration $\Delta t$ of this test phase can be adjusted in various ways, as will be shown below. If the result is a longer duration $\Delta t$ of the test phase, then the incremental buildup of pressure in zone F would in any case be ended whenever the wheel deceleration has increased once again, so that at point 7 the deceleration threshold value $-b$ is once again attained. Beyond point 6, or for a greater value of $\Delta t$ beyond point 7, a zone G of renewed pressure reduction now appears, lasting until point 8, at which the wheel deceleration changes into a renewed acceleration of the wheel. Beyond the associated point 8', the pressure is now kept constant, in zone H, until point 9'; this corresponds to a point 9 in the speed diagram at which an acceleration threshold $+b$ of the wheel acceleration is exceeded. From these points on, regulation is continued in a manner like that known from the prior art for conventional anti-skid brake systems.

As may be seen from FIG. 2 and the description above, the result in comparision with the courses of brake pressure established conventionally is substantially a prolonged pressure maintenance phase C, which causes substantially increased brake slip and thus leads to the creation of skid marks.

FIG. 3, with the aid of three diagrams, shows how the test phases are set up in temporal terms in various forms of embodiment of the method according to the invention. For the sake of comprehensibility, the courses of speed and pressure are no longer shown in detail; they correspond substantially to what was shown in FIG. 2.

Figure 3A:
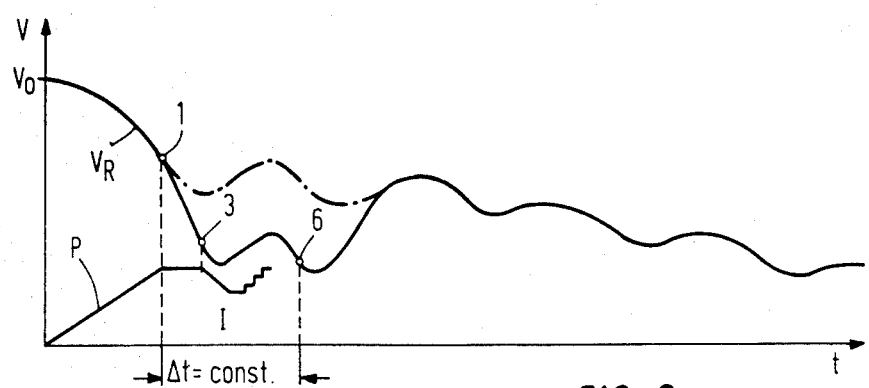

In the form of embodiment of a method according to the invention shown in FIG. 3a, a braking event is initiated, with a braking-onset speed $v_0$, where an anti-skid brake system is coming into action. Upon the attainment of point 1, a test slip switching threshold $\lambda_{1T}$ is now specified, in the manner described in detail in connection with FIG. 2, resulting in the establishment of the course of the wheel speed indicated by a solid line, rather than that shown as a dot-dash line. The test phase I in FIG. 3a has a constant temporal length, or duration. Since as a result of the increased slip no substantial vehicle deceleration occurs in the test phase I, the braking-onset speed $v_0$ can be determined with good accuracy as the quotient of the braking path and the time interval $\Delta t$.

Figure 3B:
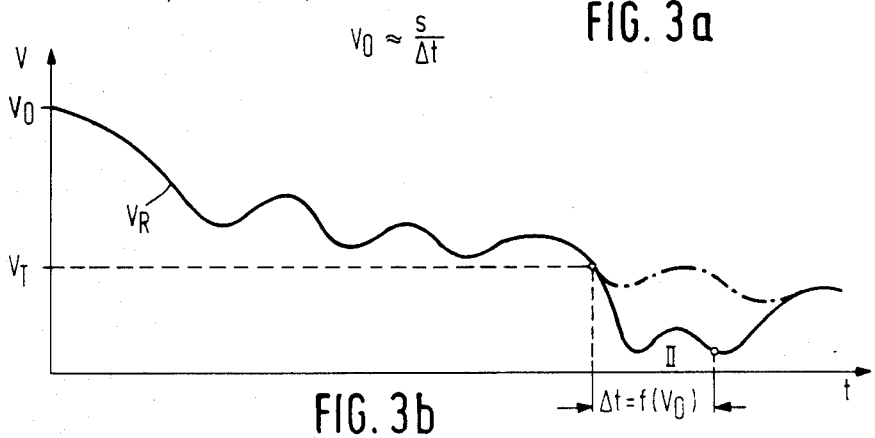

The method shown in FIG. 3a cannot, however, be used in all cases, particularly if the braking-onset speed $v_0$ is particularly great. In such cases, a method is then used according to the invention which is shown in FIG. 3b. In that case as well, a braking event is initiated with a braking-onset speed $v_0$ and with an anti-skid brake system coming into action. However, braking is not influenced at first by a test phase, until the speed falls below a predetermined test speed $v_T$, for instance 50 km/h. Now in accordance with the invention, once the speed falls below this test speed $v_T$ a test phase II is initiated, corresponding to the modified course of pressure shown in FIG. 2; however, the duration of this test phase II is made to depend on the braking-onset speed $v_0$, for instance being proportional thereto. Again, and presuming a negligible vehicle deceleration during the test phase II, this time interval can be determined with good accuracy from the quotients of the skid mark length and the fixed test speed; conversion of this time interval by calculation into the braking-onset speed is possible because of the preselected dependency.

Figure 3C:
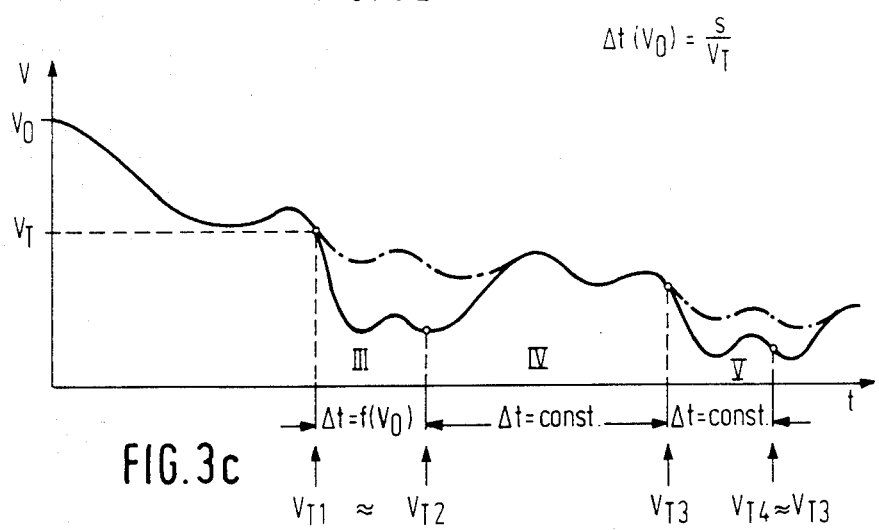

In a further form of embodiment of the method according to the invention, which is illustrated by FIG. 3c, a test phase III is initiated, as has already been shown in FIG. 3b, only when the speed falls below a test speed $v_T$. The test phase III has a temporal length that is dependent on the braking-onset speed $v_0$. The test phase III is now followed by a further phase IV, in which the anti-skid brake system now comes into effect once again in the conventional manner. Phase IV is followed by a further test phase V in which the brake slip is once again increased. The result of this sequencing of the phases III, IV and V is the production of skid marks in phases III and V. The skid mark in phase III is then a standard for the braking-onset speed $v_0$, as has already been explained in connection with FIG. 3b. In the method according to FIG. 3c, the vehicle deceleration can furthermore be determined, from the distance between the skid marks of phases III and V. That is, in phase IV there is a virtually constant vehicle deceleration, the amount of which can easily be determined from the predetermined duration $\Delta t$ and the distance between the skid marks. In accordance with a further embodiment of the method according to the invention, it is also possible to determine the vehicle deceleration in that the test phase V is also of a constant temporal length. The vehicle speed in phase III corresponds approximately to the test speed $v_T$, and the vehicle speed in phase V can be determined in the manner already described in connection with FIG. 3a. The vehicle deceleration in phase IV is then simple to determine from the difference between these two speeds, divided by a constant duration $\Delta t$ of phase IV.

Figure 4:
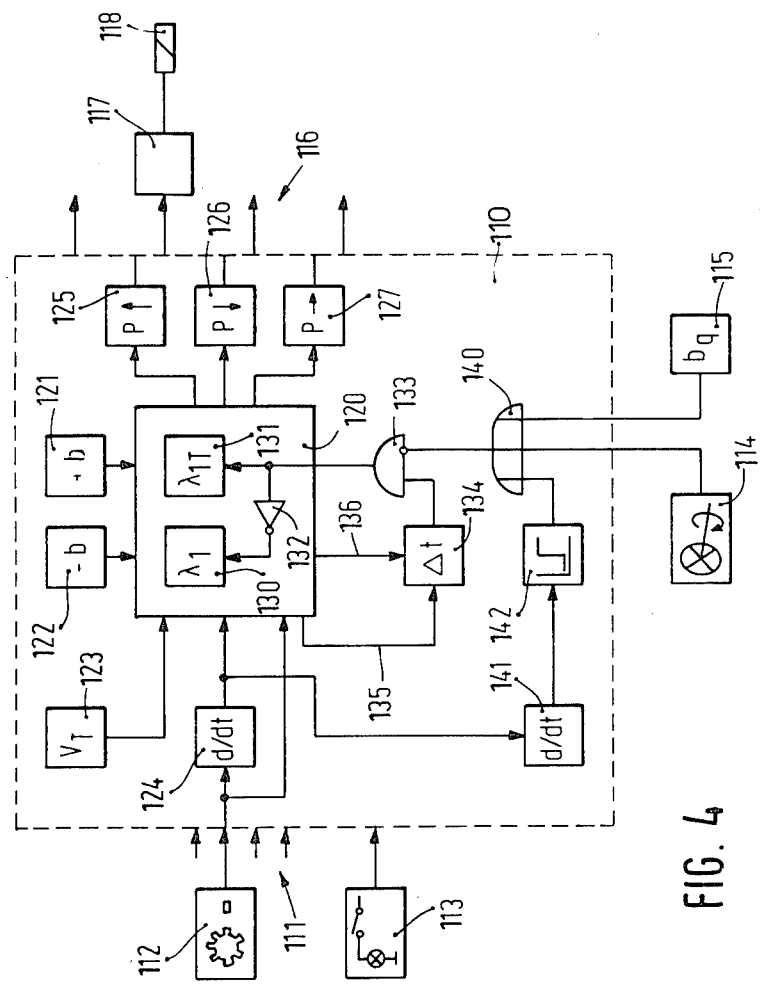

In FIG. 4, the block circuit diagram of a circuit layout such as may be used for performing the method according to the invention is shown.

This figure shows a circuit 110, which is supplied with various input signals, that is, wheel speed signals via inputs 111 from speed sensors 112 located on the wheels (for the sake of simplicity, only one of these rpm sensors 112 is shown); a signal relating to the triggering of a braking event via a brake light switch 113; and finally, signals from a transducer 114 for the steering wheel deflection angle and a transducer 115 for transverse acceleration.

The circuit 110 is connected with various outputs 116 to magnetic valves 118 regulating the brake pressure in the individual wheels (again, for the sake of simplicity only one magnetic valve 118 is shown); the magnetic valve 118 is triggered via a pressure regulator 117.

The nucleus of the circuit 110 is an evaluation circuit 120, such as is conventional in anti-skid brake systems. This evaluation circuit 120 is supplied with constant signals from blocks 121, 122, 123, specifically the acceleration threshold +b, the deceleration threshold −b and finally the test speed $v_T$. In the form of input signals, the wheel speed signals travel via differentiation circuits 124 (of which again only one is shown) to the evaluation circuit 120. On the output side, the evaluation circuit 120 is connected to three circuits 125, 126, 127, which symbolically represent output signals for increasing pressure, reducing pressure and maintaining constant pressure, respectively.

In conventional evaluation circuits 120 of anti-skid brake systems, a slip switching threshold $\lambda_1$ is furthermore provided, which is indicated in FIG. 4 by a block 130. Located beside it in accordance with the invention is a predetermined test slip switching threshold in a block 131; blocks 130, 131 are activatable in alternation by an AND gate 133 by switching on an inverter 132 preceding the block 133. One input of the AND gate 133 is connected to a timing circuit element 134. The timing circuit element 134 is triggered via two control lines 135, 136 by the evaluation circuit 120; a starting signal for the timing circuit element 134 is transmitted on the line 135 when the evaluation circuit 120 becomes effective in terms of influencing the brake pressure, and the control line 136 carries a signal corresponding to the braking-onset speed, which determines the On-state time or timing interval of the timing circuit element 134.

A further, inverted input of the AND gate 133 is connected with the output of an OR gate 140, which has three inputs. The first two inputs are connected to the steering wheel deflection angle transducer 114 and the transverse acceleration transducer 115, respectively; the third input is connected to the output of a threshold value circuit 142, which is triggered on the input side by a differentiation circuit 141, which in turn is acted upon by the output signal of the differentiation circuit 124.

Operation of the circuit of FIG. 4:

The speed signals from the transducer 112 are supplied, first, directly to the evaluation circuit 120 and, second, via the differentiation circuits 124. The conventional criteria for the attainment of deceleration, acceleration and slip thresholds can thereby be formed in the manner described above and known from the prior art. The conventional slip switching threshold $\lambda_1$ is derived from the block 120, because the inverter 132 is not triggered and block 130 is accordingly activated. Now, if a test phase is to be initiated, a control signal travels over the line 135 to the timing circuit element 134, so that a positive signal prevails at one input of the AND gate 133 for the period $\Delta t$. On the presumption that the other input is conducting as well, then a switchover is made in the evaluation circuit 120, by means of the inverter 132, from the slip switching threshold $\lambda_1$ to the test slip switching threshold $\lambda_{1T}$. It is then possible via the line 136 to affect the on-state time $\Delta t$ of the time function element 134 in accordance with the vehicle speed prevaailing at a given time, in particular in such a manner that the on-state or timing interval time is low at high speeds and high at low speeds.

The course of pressure is generated in the magnetic valves 118 via the blocks 125, 126, 127 as well known.

If the test phase is supposed to begin, as shown in FIGS. 3b and 3c, only below a predetermined test speed $v_T$, the vehicle speed prevailing at that time is compared with the test speed $v_T$ stored in block 123, and the test phase is triggered via the line 135 only upon the attainment of this speed value. The on-state time of the time function element 134 is influenced via the line 136 in such a manner that it depends on the braking-onset speed that was stored at the onset of the braking event, for instance being proportional thereto.

The method illustrated by FIG. 3c can be realized in a simple fashion by taking the above-described steps in sequence over time.

It is furthermore possible to design the evaluation circuit 120 in duplicate fashion, so that both a normal braking phase with an anti-skid brake system and a test phase can elapse at the same time. Then the magnetic valves 118 of the rear wheels and of one front wheel, for example, can be triggered by the usual signals, while the other one or both front wheels are supplied with the test signals. In this manner it is possible to affect driving stability as little as possible during the test phases.

Finally, a safety circuit is provided via the OR gate 140 for the case where the vehicle is entering into critical operating conditions. In order to retain the full effect of the anti-skid brake system under these conditions, the inverting input of the AND gate 133 can be triggered and the AND gate thereby blocked for the further passage of the output signal of the timing circuit element 134. At the output of the OR gate 140, a signal then appears whenever the transverse acceleration of the vehicle exceeds a predetermined amount, which is recognized by the transverse acceleration transducer 115; or whenever the steering wheel deflection angle exceeds a predetermined amount, which is recognized by the steering wheel deflection angle transducer 114; or when the gradient of the wheel deceleration exceeds a predetermined amount, which is recognized via the differentiation circuit 124, 141 and the threshold circuit 142. This last case occurs, for instance, if the wheel deceleration increases sharply on a street wet from rain in the stable range, thus threatening the onset of an instability in vehicle behavior.

We claim

1. In a vehicle anti-skid system having
    transducers for detecting operating condition parameters of the vehicle and an evaluation circuit forming control signals to influence braking pressure at predetermined operating conditions of the vehicle, in dependence on the transducer signals,
    a method for storing operating condition parameters of the vehicle comprising the steps of
    sensing when the control signals for influencing the braking pressure are being generated;
    and storing operating condition parameters comprising at least one of:
    longitudinal vehicle speed
    longitudinal deceleration
    transverse vehicle speed
    transverse deceleration
    braking path
    during the period in which the brake pressure influencing signals are being generated.

2. In a vehicle anit-skid system having
    transducers for detecting operating condition parameters of the vehicle and an evaluation circuit forming control signals to influence braking pressure at predetermined operating conditions of the vehicle, in dependence on the transducer signals,
    a method for storing operating condition parameters of the vehicle comprising the step of
    applying markings to the road surface during the period in which the control signals for influencing the brake pressure are being generated.

3. Method according to claim 1, further including the step of
    applying markings to the road surface during the period in which the control sighals for influencing the brake pressure are being generated.

4. Method according to claim 2, wherein the marking step comprises applying said markings in pulsed form with constant pulse time.

5. Method according to claim 1, wherein the step of storing the operating condition parameters is carried out during the duration of generation of said brake pressure influencing signals.

6. Method according to claim 5, including the step of sensing a predetermined threshold deceleration ($-b_G$);
    and carrying out the step of storing the brake pressure influencing signals only in the event that the predetermined threshold deceleration is exceeded simultaneously with occurrence of said at least one operating condition.

7. Method according to claim 5, further comprising the step of sensing response of at least one of:
    a brake light switch (13);
    a brake pressure regulator (12);
    and carrying out the step of storing the brake pressure influencing signals only if response of at least one of: the brake light switch (13); the pressure regulator (12)
    is simultaneously sensed.

8. Method according to claim 1, for use with a memory (23);
    and including the steps of
    transferring into the memory (23) the control signal;
    and reading out the stored signals to control, subsequent to the original storage, the operating conditions of a vehicle, to reconstruct the course of braking event which resulted in the initial storage of said operating signals.

9. Method according to claim 8, wherein the memory (23) is a plug connectable module;
    including the step of
    disconnecting and reconnecting said plug connectable module.

10. In a vehicle anti-skid system having
    transducers for detecting operating condition parameters of the vehicle and an evaluation circuit forming control signals to influence braking pressure at predetermined operating conditions of the vehicle, in dependence on the transducer signals,
    a method for storing operating condition parameters of the vehicle comprising the steps of
    sensing when the control signals for influencing the brake pressure are being generated;
    sensing if the existing slip ($\lambda$) between a wheel of the vehicle and the road surface is below a predetermined slip switching threshold ($\lambda_1$);
    defining, during generation of the brake pressure influencing signals, a test phase (I, II, III, V);
    reducing the slip switching threshold ($\lambda_1$) to a lower predetermined amount ($\lambda_{1T}$) during said test phase if the existing slip was below the slip switching threshold;

and generating a record representative of skid marks if the existing slip ($\lambda$) has dropped below the predetermined level of the slip switching threshold ($\lambda_{1T}$).

11. Method according to claim 10, further including the steps of sensing wheel deceleration;

sensing deceleration of at least one wheel of the vehicle;

determining if the sensed deceleration exceeds a predetermined amount ($-b$);

initiating a test phase (I, II, III, V) if the sensed wheel deceleration acceleration exceeds said predetermined amount;

terminating increase of braking pressure and maintaining the braking pressure at a constant level;

determining if a predetermined test slip switching threshold ($\lambda_{1T}$) is attained, said step of maintaining the pressure at a constant level continuing until said test slip switching threshold is reached.

12. Method according to claim 10, including the step of reducing braking pressure after the test slip switching threshold ($\lambda_{1T}$) has been passed until the predetermined level of wheel deceleration ($-b$) is reached;

maintaining the pressure constant until the reattainment of the test slip switching threshold ($\lambda_{1T}$), and then increasing the braking pressure.

13. Method according to claim 10, wherein the test phase has a predetermined time duration, and is initiated upon the first generation of brake pressure influencing signals.

14. Method according to claim 10, including the step of sensing vehicle speed;

determining if, upon generation of the brake pressure influencing signals, the vehicle speed is at or below a predetermined value;

initiating the test phase (II, III) during the first cycle of generation of brake pressure influencing signals after the speed has fallen below the predetermined test vehicle speed ($V_T$);

and controlling the length of the test period as a function of the speed level ($v_0$) at the initiation of braking.

15. Method according to claim 14, including the step of following the test phase (III) by a period of brake pressure maintenance;

determining if slip of one wheel is below a predetermined slip switching threshold ($\lambda_1$);

and initiating a further test phase (V) in dependence on passing a test slip switching threshold ($\lambda_{1T}$).

16. Method according to claim 15, wherein the further test phase (V) has a constant length.

17. Method according to claim 15, including the step of sensing vehicle speed;

and setting the test slip switching threshold ($\lambda_{1T}$) at a low level at sensed higher speeds, and at a higher level at sensed lower speeds.

18. Method according to claim 10, including the step of sensing vehicle speed;

and setting the test slip switching threshold ($\lambda_{1T}$) at a low level at sensed higher speeds, and at a higher level at sensed lower speeds.

19. Method according to claim 10, including the step of rendering effective at least one of the test phases (I, II, III, V) only with respect to the wheels of any one axle of the vehicle.

20. Method according to claim 10, including the step of sensing a critical operating condition comprising at least one of:

predetermined transverse acceleration;

steering wheel deflection angle;

rate of deceleration of a wheel of the vehicle;

and inhibiting generation of at least one of the test phases (I, II, III, V) upon sensing at least one of said critical operating conditions.

21. Method according to claim 11, including the step of sensing a critical operating condition comprising at least one of:

predetermined transverse acceleration;

steering wheel deflection angle;

rate of deceleration of a wheel of the vehicle;

and inhibiting generation of at least one of the test phases (I, II, III, V) upon sensing at least one of said critical operating conditions.

* * * * *